(12) United States Patent
Erskine et al.

(10) Patent No.: US 7,742,499 B1
(45) Date of Patent: Jun. 22, 2010

(54) ADAPTIVE BANDWIDTH NETWORK MANAGEMENT FOR VOIP NETWORK

(75) Inventors: James Erskine, Belleville (CA); Peter Tarle, Belleville (CA); Andrey V. Mayorov, Nizhny Novgorod (RU)

(73) Assignee: Nortel Networks Limited, St. Laurent, Quebec (CA)

( * ) Notice: Subject to any disclaimer, the term of this patent is extended or adjusted under 35 U.S.C. 154(b) by 790 days.

(21) Appl. No.: 11/206,636

(22) Filed: Aug. 18, 2005

(51) Int. Cl.
*H04J 3/16* (2006.01)
*H04L 12/66* (2006.01)
*H04L 12/28* (2006.01)

(52) U.S. Cl. .................. 370/468; 370/352; 370/395.21; 370/401

(58) Field of Classification Search ................ 370/468, 370/211–232, 236, 235, 237, 352–356, 395.43, 370/395.21, 401
See application file for complete search history.

(56) References Cited

U.S. PATENT DOCUMENTS

| | | | | |
|---|---|---|---|---|
| 6,031,845 | A * | 2/2000 | Walding | 370/468 |
| 6,665,264 | B1 * | 12/2003 | Davison et al. | 370/230 |
| 6,850,764 | B1 * | 2/2005 | Patel | 455/450 |
| 7,236,483 | B2 * | 6/2007 | Yeom | 370/352 |
| 7,263,095 | B1 * | 8/2007 | Sarkar | 370/352 |
| 7,272,134 | B2 * | 9/2007 | Iwama et al. | 370/352 |
| 7,430,179 | B2 * | 9/2008 | Towns-von Stauber et al. | 370/252 |
| 2002/0101860 | A1 * | 8/2002 | Thornton et al. | 370/352 |
| 2002/0176406 | A1 * | 11/2002 | Tsukada et al. | 370/352 |
| 2006/0015639 | A1 * | 1/2006 | Taylor | 709/235 |
| 2006/0098625 | A1 * | 5/2006 | King et al. | 370/352 |
| 2006/0146859 | A1 * | 7/2006 | Baldwin et al. | 370/438 |
| 2006/0268678 | A1 * | 11/2006 | Dhesikan et al. | 370/216 |
| 2007/0019563 | A1 * | 1/2007 | Ramachandran et al. | 370/252 |

* cited by examiner

*Primary Examiner*—Steven H Nguyen
*Assistant Examiner*—Candal Elpenord
(74) *Attorney, Agent, or Firm*—Withrow & Terranova, PLLC (57) ABSTRACT

A packet-based communications system or network is configured into multiple geographically distinct network bandwidth zones having interzone communications links with a configured maximum bandwidth. Adaptive bandwidth management based upon quality of server (QoS) measurement between two zones is utilized to dynamically raise or lower the maximum allowable bandwidth limit for the link between the two zones. When QoS between two zones degrades, the allowable bandwidth for new calls between the two zones is lowered to a point that assists in increasing the QoS back to an acceptable level (i.e., by blocking new calls or rerouting them). In one embodiment, the QoS information takes the form of QoS alarms generated and transmitted by active IP phones in the network bandwidth zone.

17 Claims, 3 Drawing Sheets

FIG. 1

| SOURCE | | DESTINATION | | QoS FACTOR | CONFIGURED INTERZONE B/W | SLIDING MAXIMUM B/W | ACTUAL INSTANTANEOUS B/W USED | AVERAGE CALLS/HOUR |
|---|---|---|---|---|---|---|---|---|
| ZONE | VPNI | ZONE | VPNI | | Kbps | Kbps | Kbps | CALLS/HR |
| 5 | 33 | 8 | 34 | 100 | 1000 | 1000 | 384 | 4110 |
| 5 | 33 | 4 | 33 | 100 | 1000 | 1000 | 750 | 6954 |
| 5 | 33 | 3 | 38 | 45 | 1000 | 450 | 128 | 1500 |
| 5 | 33 | 7 | 44 | 100 | 1000 | 1000 | 128 | 1201 |
| 5 | 33 | 9** | 59 | 100 | 1000 | 1000 | 600 | 7123 |
| 7 | 44 | 8 | 34 | 100 | 256 | 256 | 109 | 189 |
| 7 | 44 | 4 | 33 | 100 | 256 | 256 | 0 | 45 |
| 7 | 44 | 3 | 38 | 55 | 256 | 141 | 128 | 75 |
| 7 | 44 | 5 | 33 | 100 | 256 | 256 | 128 | 1201 |
| 7 | 44 | 9** | 59 | 100 | 256 | 256 | 128 | 120 |

ADAPTIVE BANDWIDTH NETWORK MANAGEMENT FOR VOIP NETWORK

TECHNICAL FIELD

The present invention relates generally to communication systems, and more particularly to an apparatus and method for adaptive bandwidth management for Voice-Over-IP (VOIP) networks.

BACKGROUND

Traditional Internet Protocol (IP) networks have evolved from providing best effort service to providing guaranteed quality of service (QoS) levels for end users. Existing methods of providing high levels of QoS are not always adequate in the voice over IP (VOIP) domain. Prior art call admission control (CAC) generally allows or disallows calls to be set up based on the number of current calls and expected call loading. Thus, such control is not generally based upon QoS measurements of the actual network performance. By measuring the actual QoS network performance parameters at appropriate locations using known QoS factors in real-time, new calls may be limited and/or redirected, thereby providing the desired or needed quality for existing calls and future calls.

Accordingly, there is needed an apparatus and method for using real-time QoS information from one or more points in the network to adapt the bandwidth limit relative to network performance.

SUMMARY

In accordance with one embodiment of the present invention, there is provided a method of adaptive bandwidth management for a packet-based communications network. Quality of service (QoS) information is received relating to active communications across a communications link between two zones in the packet-based communications network. A request for a new call is received between the two zones, and the new call is rejected in response to the received QoS information.

In another embodiment, the method further provides that the QoS information includes one or more QoS alarms generated and transmitted from a communications device within one of the zones, and the method stores a maximum interzone bandwidth value representing a maximum amount of allowable bandwidth on the communications link between the two zones, lowers the maximum bandwidth value to a sliding maximum interzone bandwidth value in response to the received QoS information, determines an amount of bandwidth presently being utilized across the communications link between the two zones, determines an amount of bandwidth necessary to handle the new call, and rejects the new call when the sum of the amount of bandwidth presently being utilized and the amount of bandwidth necessary for the new call exceeds the sliding maximum interzone bandwidth value.

Furthermore, a computer program performing one or more of these methods is embodied on a computer readable medium and operable to be executed by a processor.

In yet another embodiment, there is provided a call server having a network interface. The network interface receives quality of server (QoS) information about an active communications link between a first zone and a second zone in a packet-based communications network, and further receives a call setup message from a first communications device requesting a new call over the communications link between the first zone and the second zone. A processor of the call server processes the received QoS information and the call setup message, and determines whether to accept or reject the new call over the communications link between the first zone and the second zone.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
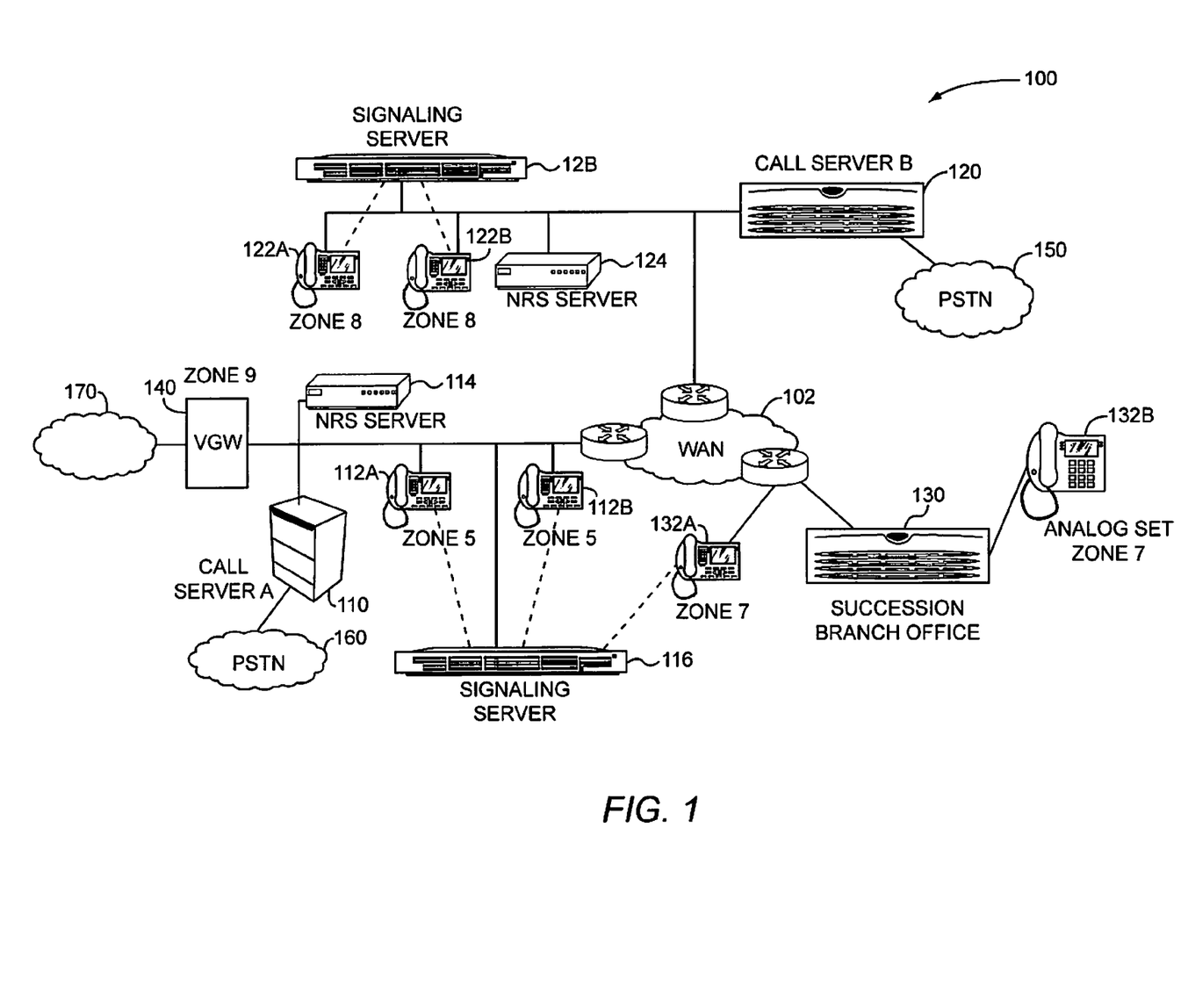
FIG. 1 illustrates an example communications network illustrating the network zone concept of the present invention.

FIG. 1 illustrates an example communications network system 100 for adaptive network bandwidth zones and call management and illustrating the network zone concept of the present invention. The system or network 100 shown in FIG. 1 is for illustration purposes only. Other embodiments of the system 100 may be used without departing from the scope of this disclosure.

In this example, the system 100 includes several main components, including a call server 110 (Call Server A), a call server 120 (Call Server B), a succession branch office 130 (Succession Branch Server), a voice gateway 140 (VGW), and a network 102 interconnecting the components of the system 100. The network 102 may include one or more local area networks ("LAN"), metropolitan area networks ("MAN"), wide area networks ("WAN"), all or portions of a global network such as the Internet, or any other communication system or systems at one or more locations, or combination of these. Further, the network 102 (and system 100) may include various servers, routers, bridges, and other access and backbone devices. In one embodiment, the network 102 is a packet network that utilizes any suitable protocol or protocols, and in a specific embodiment, the network 102 (and most components of the system 100) operates in accordance with the Internet Protocol (IP) and, more particularly, is a VOIP network. As will be appreciated, the concepts and teachings of the present invention are not limited to VOIP, but may be utilized in any data packet network that facilitates communication between components of the system 100, including Internet Protocol ("IP") packets, frame relay frames, Asynchronous Transfer Mode ("ATM") cells, or other data packet protocols.

As shown, the system 100 may be divided into network bandwidth zones. A bandwidth zone is generally defined as a geographically distinct zone within the network 102. Typically, the zones may be organized or configured (or aligned) in accordance with the main call management components in the system 100—i.e., call servers, branch offices, and/or voice gateways. In FIG. 1, there are shown several different network bandwidth zones. The network bandwidth zones include the zone associated with the call server 110 (identified as Zone 5), the zone associated with VGW 140 (identified as Zone 9), the zone associated with the call server 120 (identified as Zone 8), and the zone associated with succession branch office 130 (identified as Zone 7). Thus, various communications devices are coupled or assigned to, or lie within, the respective network bandwidth zone. As will be appreciated, additional zones (and other components) may be included in the system 100, and FIG. 1 only illustrates but one exemplary configuration to assist in describing the operation of the present invention to those skilled in the art.

The call server 110 has coupled thereto communication devices 112a, 112b, a network resolution (NRS) server 114, and a signaling server 116. Similarly, the call server 120 has coupled thereto communication devices 122a, 122b, a network resolution (NRS) server 124, and a signaling server 126. Call servers (and perhaps other components) communicate with NRS servers which function to assist in the resolution of unknown addresses (e.g., in the H.323 protocol and Session-Initiated-Protocol (SIP)). Signaling servers function to serve as a proxy between the call server and external devices (e.g., communications between a terminal and a call server first transitions over a signaling server). Further description of the NRS servers and signaling servers, except as provided below, is not necessary to understand the present invention, and these components and their functionality are well-known to those skilled in the art. The call servers 110, 120, the SBO 130, and the VGW 140 each include one or more controllers or processors, memory, logic circuitry, and interfacing circuitry to interface to the network 102.

The succession branch office 130 has coupled thereto communication devices 132a, 132b.

Though not shown, the VGW 140 typically has one or more communications devices coupled thereto via a network 170, and in the embodiment shown, the VDW 140 is a third party voice gateway.

As will be appreciated, the call server 110 and the call server 120 may also interface to the public switched telephone network (PSTN), identified by reference numerals 150, 160. Therefore, the call servers 110, 120 also include functionality to interface and allow manage/control calls from/to the communications devices within the network 102 to/from devices in the PSTN.

The communication devices 112, 122, 132, represent devices utilized by users or subscribers during communication sessions over the network 102. For example, each of the communication devices may include an input/output device having a microphone and speaker to capture and play audio information. Optionally, each of the communication devices 112, 122, 132 may also include a camera and/or a display to capture and play video information. During a communication session (such as a telephone or videophone call or conference), the communication devices 112, 122, 132 communicate with each other (and/or other devices via the PSTN or VGW 140) through the network 102. In this way, the communication devices 112, 122, 132 may exchange audio, video, graphical, or other information during a communication session. Each of the communication devices 112, 132, 132 may be constructed or configured from any suitable hardware, software, firmware, or combination thereof for transmitting or receiving information over a network. As an example, the communication devices 112, 122, 132 could represent telephones, videophones, computers, personal digital assistants, and the like, etc. In the particular example shown in FIG. 1, the communication devices 112a, 112b, 122a, 122b, and 132a are digital or IP-enabled sets, while the communication device 132b is an analog set.

The communication devices 112, 122, 132 are coupled to the respective call server 110, 120 (or branch office 130) and are thus coupled to the network 102. Similarly, one or more communication devices (not shown) are coupled to the voice gateway 140 via the network 170. In this document, the term "couple" and its derivatives refer to any direct or indirect communication between two or more elements, whether or not those elements are in physical contact with one another. The call servers 110, 120 and branch office 130 (and VGW 140) facilitate communication by and/or between the communication devices 112, 122, 132 (and any devices coupled to the PSTN 160, 170 or the VGW 140) over the network 102. In addition, signaling messages may be exchanged over the network 102. Each of the call servers 110, 120, the branch office 130 and the VGW 140 may be constructed or configured from any suitable hardware, software, firmware, or combination thereof for facilitating communication by communication devices over a network. The general configuration, functioning and operation of such components are readily known to those of ordinary skill in the art.

The general operation of the present invention, as well as specific examples, will now be described. Between each respective bandwidth zone, a transmission or communications link is provided through which data communications are transmitted between the zones. Each link between two respective zones may include one or more physical links (operating independently or together), one or more logical or virtual links (such as a VPN) configured within a physical link, or any combination thereof.

Each link between two respective zones has an initial maximum interzone bandwidth that is used as a baseline to calculate a dynamic bandwidth limit between the two bandwidth zones. If the QoS between the two bandwidth zones is degrading, then the maximum interzone bandwidth between those two zones is reduced as a percentage of the initial value (or prior maximum interzone bandwidth value). This new value is used as the new maximum interzone bandwidth, may be referred to as a "sliding maximum" interzone bandwidth, and is used for purposes of allowing/disallowing or redirecting any new calls between the two zones.

Various QoS parameters may be used in configuring the sliding maximum interzone bandwidth, such that the available bandwidth may be reduced to a lower level or raised to a higher level, at the same or different rates. Not only may the magnitude be changed, but the rate of change may also be adjusted. The parameters used may also depend on the type of transmission link (e.g., small low speed line to a branch office or high speed, high capacity link between peer nodes). Also included is a hysteresis function so the sliding maximum interzone bandwidth value does not oscillate excessively.

The communications devices 112, 122, 132 (including VGWs) monitor, detect and/or calculate one or more various QoS parameters at the device, including packet loss, latency, jitter and R factor. Other parameters providing information about the communications session and/or link may be utilized, as desired. The QoS parameters and information, in one or more formats, is transmitted to the call server associated with that particular communications device. This QoS information may be transmitted directly to the call server (e.g., raw information or using QoS alarms) or to the signaling server (or other device in the system) and then forwarded to the call server. The QoS information is then used to adjust the then current sliding maximum interzone bandwidth based upon the QoS information, as appropriate.

In one particular embodiment, the QoS information includes QoS alarms generated by the communications devices (and possibly VGWs) and transmitted to the appropriate signaling server and passed to the corresponding call server. An algorithm may be used to calculate a QoS factor which defines the relative quality being experienced on the link between the two network bandwidth zones. The QoS factor may be based upon the actual received QoS information, and perhaps other parameters. In this embodiment, an algorithm applies weights to one or more of the following to calculate the QoS factor: type of alarm (e.g., packet loss, latency, jitter, R factor, etc.); value of exceeded unacceptable threshold; alarms per hour; call rate; programmed interzone bandwidth limits; existing QoS factor. The QoS factor is then used to calculate (or recalculate) the sliding maximum interzone bandwidth In general terms, as the QoS degrades (i.e., QoS alarms are generated and reported), the QoS factor is calculated (or recalculated) which results in an update to the sliding maximum interzone bandwidth. As QoS alarms are reported, the sliding maximum interzone bandwidth will reduce and, pending no further QoS alarms, the sliding maximum interzone bandwidth will increase over time. Generally, two mechanisms change the value of the sliding maximum interzone bandwidth: QoS alarms (causing a reduction in value) and time (causing an increase in value). Depending on the desired algorithm, the allowable bandwidth between two network bandwidth zones (for a communications link therebetween) is reduced in order to preserve or maintain an acceptable QoS between the two zones.

In one embodiment, the sliding maximum interzone bandwidth value is calculated as percentage of the configured interzone bandwidth (initial configuration). The formula may be calculated as: Sliding Maximum Interzone Bandwidth=QoS Factor×Configured Interzone Bandwidth, with the QoS factor ranging from 0 to 100. In another embodiment, it may be calculated as a factor of the then current sliding maximum interzone bandwidth value (not the initial configured value).

The following provides a description of one embodiment in accordance with the present invention. The QoS Factor is a percentage that is used to determine the allowable bandwidth between zones. As QoS alarms are generated and received, the QoS factor reacts (calculated). The rate, frequency and magnitude of change depend upon user defined coefficients and the value of the reported QoS alarm. One equation (or formula) for calculating the QoS Factor is shown below. In this equation, the formula takes on the same general form regardless of the type of reported QoS alarm (i.e., if the incoming QoS alarm is a jitter alarm, then replace PLfactor with Jfactor and Cpl with Cj).

$$QoSFactor = QoSFactor_1 - \left(\frac{\frac{alarms}{hour}}{\frac{calls}{hour}} \cdot \frac{1}{}\right)[PLfactor \cdot Cpl + [100 - QoSFactor_1](Cqos)]]$$

The incoming QoS alarm contains the Plfactor. The user defined coefficients are Cpl and CQoS. Generally, if a large number of QoS alarms are received in a short span of time, then the QoS factor will be reduced (or drop off) quickly. If only a small number of QoS alarms are received, then the QoS will be reduced (or drop off) slowly.

The number of calls per hour (call rate) and number of alarms per hour (alarm rate) are typically maintained by each call server for its own zone.

The parameters Cr, Cpl, Cd, Cj, and CQoS are user defined coefficients for R-Factor, Packet Loss, Delay, and Jitter. The coefficients shape how fast the sliding maximum interzone bandwidth will react to incoming QoS alarms. These coefficients may also allow the user to configure different coefficients for different types of links or virtual trunk paths. For example, a high capacity path may have different co-efficients than a small capacity path. The terms Rfactor, PLfactor, Dfactor, and Jfactor are the QoS alarm values reported by the communication devices (or VGWs) The term QoSFactor1 is the QoSFactor when the QoS alarm was received (i.e., the then current QoS Factor).

Below is a specific example for calculating the QoS Factor based on a QoS packet loss alarm being reported.

QoS007 QoS packet loss unacceptable: [PL:80 LT:0 JIT:0 R:0]

NearEnd: TN[061 11], zone[8]

FarEnd: IP[47.11.232.33:5234] TN[031 17], zone[11].

At time t1, a QoS alarm is received indicating packet loss between two respective bandwidth network zones (zone 8 and zone 11). The alarm indicates a Plfactor=80. In the equation, Cpl is configured to equal 0.10 and CQoS=0.1. No other alarms have been received in the last hour. There are 10 calls per hour average. Using the previous equation, QoSFactor=100−1*1/10*[80*0.10+[100−100]*0.10], thus QoSFactor=100−0.8=99.2. Thus, the new sliding maximum interzone bandwidth is calculated as equal to 99.2/100 multiplied by the configured maximum interzone bandwidth. Therefore, if the configured maximum equaled 1000 Kbps, then the new sliding maximum equals 9920 Kbps, which is used to determine if sufficient bandwidth is left to accommodate a new call.

At predetermined time intervals, the QoS factor, and hence the sliding maximum interzone bandwidth, is incremented or increased. The amount and rate of increase is configurable, as desired. In one embodiment, two configurable variables ZQRT (QoS Response Time, amount of increase) and ZQRTI (QoS Response Time Interval, time interval after which an increase occurs) may be used. For example, if ZQRT is configured to 4%, ZQRTI is configured to 55 seconds, and the current QoS Factor equals 80%, then the QOS Factor will increase from 80% to 83.2% after one 55 second interval. Other methods may be used to increase the QOS Factor over time.

As will be appreciated, different equations for calculating (and/or modifying over time) the QoS Factor may be utilized, consistent with the teachings of the present invention, and those of ordinary skill in the art will recognize that different variables (and values for variables) and weightings may be utilized, as desired, to meet or take into consideration various parameters and function aspects of a particular application or desired goal.

Figure 2:
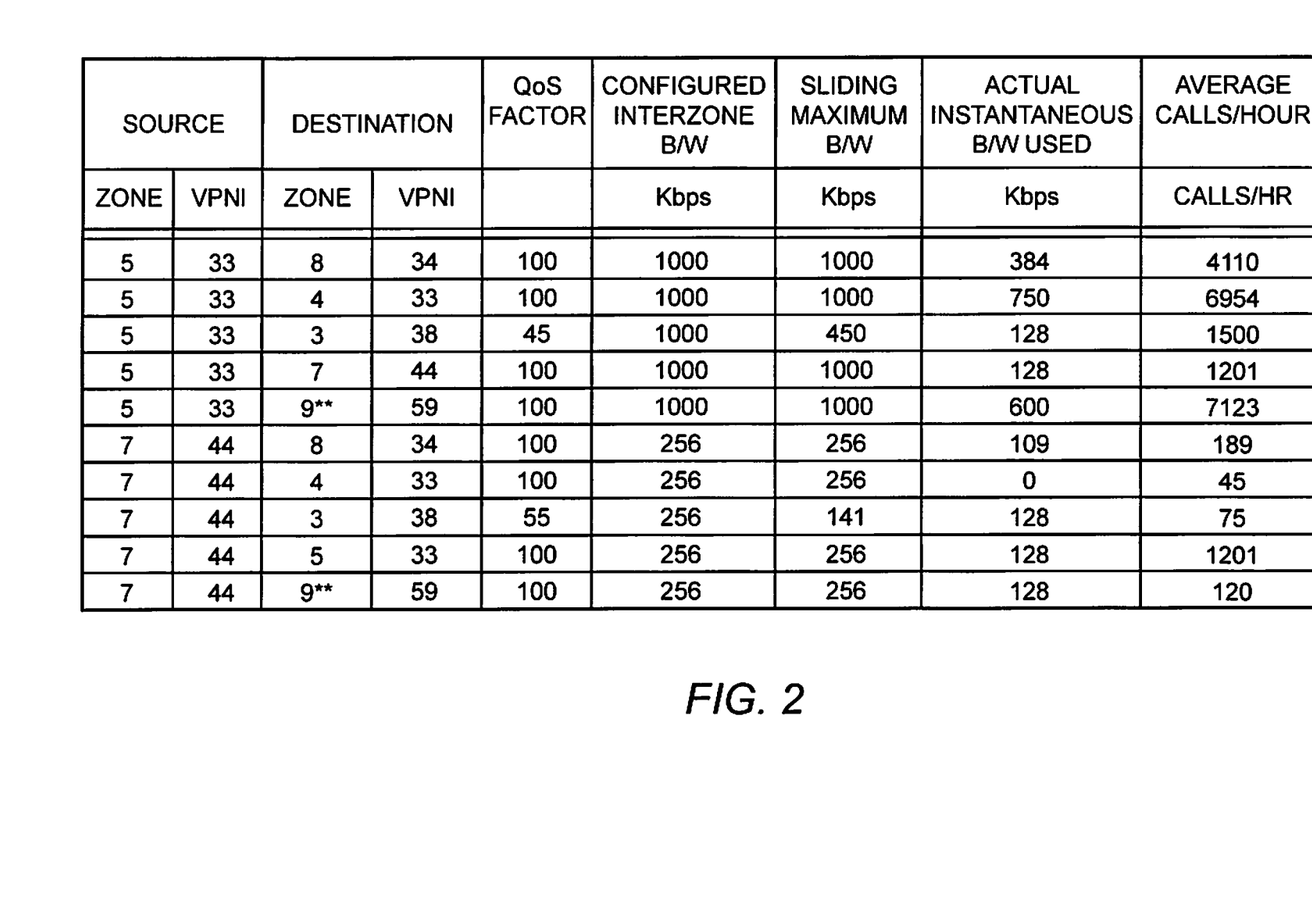
FIG. 2 depicts an example data structure (management table) of information maintained by each call server for each associated interzone link.

During call processing, the call setup proceeds at the originating end until eventually, the destination network bandwidth zone is known. With knowledge of both the source zone and the destination zone, the source call server consults a QoS data structure (as shown in FIG. 2 and described further below) to determine if an additional call can be accommodated (or allowed) across the interzone link. This is determined by adding the additional bandwidth required (of the new call) to the current bandwidth between the zones, and comparing to the sliding maximum interzone bandwidth. If this amount is less than the sliding maximum value, then the call tentatively proceeds, and the QoS table is updated with the additional bandwidth used by that call. If the amount exceeds the sliding maximum value, then the call is blocked by the source call server and an alternative route may be attempted.

Similarly, at the destination end of the call, the call server also checks its respective QoS data structure in order to determine whether there is sufficient bandwidth to add that call. If so, then the call proceeds (and the QoS table is updated for that call server). If not, then the call is blocked by the destination call server and an alternative routing treatment may be provided.

In one embodiment, each call server maintains its own QoS data structure table for all the interzone links from its own zone, and for any other zone in which an endpoint does not support the concept of adaptive bandwidth management zones, such as succession branch offices (SBOs) or SRGs. Thus, the data structure table, as shown in FIG. 2, only calculates and provides sliding maximum bandwidth information for those zones for which it is responsible. The sliding maximum interzone bandwidth is calculated by each call server based upon the QoS information the call server receives from its corresponding communication devices and other call processing information. A corresponding communication device may also be a communication device coupled to an endpoint (SBO, SRG) which is under the supervision of the call server.

In one embodiment, a given source/destination call server has no knowledge of the calculated sliding maximum value for the given destination/source call server that will be used by the respective call server to accept or reject a call between the two zones. Therefore, for the same interzone link, the sliding maximum interzone bandwidth value utilized by the source call server may actually be different from the sliding maximum interzone bandwidth value utilized by the destination call server (to accept or block calls). One call server may determine that a new call may be accepted, while the other call server determines the new call should be rejected. Real-time QoS measurements and call processing information at each end may, therefore, indicate one end has a higher/lower QoS than the other end, or the configured bandwidth at each end may be different, etc.

In other embodiments, each call server may communicate its sliding maximum interzone bandwidth value(s) for their zone(s) to each of the other call servers, so a more uniform data structure table may be maintained by each location that reflects the lowest sliding maximum for each link. In this case, only one call server may be required to determine whether the current sliding maximum interzone bandwidth (for a given link) is sufficient to handle the new call, instead of having both call servers independently perform this determination. In another embodiment, a central location maintains and manages a global data structure for all interzone links and the call servers may query the central location for periodic data structure table updates or for a determination that the call may proceed (i.e., the central location may maintain and calculate the QoS Factors for each zone and sliding maximum interzone bandwidth values).

In one embodiment, succession branch offices (SBOs) and SRGs (such as SBO 130) are not responsible for tracking/maintain interzone bandwidth usage or bandwidth specific call treatment during call setup. Rather, a main office call server (such as call server 110) is responsible for these functions. This means that calls to and from an SBO (or SRG) are tandemed through the main office call server.

Now turning to FIG. 2, in conjunction with the system 100 shown in FIG. 1, there is illustrated an example data structure table 200 of information maintained by the call server 110, and may be referred to as a network bandwidth zone management table. As shown, the call server 110 is responsible for Zones 5 and 7, with Zone 7 being a zone configured as a succession branch office (SBO). There are multiple interzone links shown, including links from Zone 5 (Call Server 110) to each of Zone 8 (Call Server 120), Zone 4 (not shown in FIG. 1), Zone 3 (not shown in FIG. 1), Zone 7 (SBO 130) and Zone 9 (VGW 140), and links from Zone 7 (SBO 130) to each of Zone 8 (Call Server 120), Zone 4 (not shown in FIG. 1), Zone 3 (not shown in FIG. 1), Zone 5 (Call Server 110) and Zone 9 (VGW 140).

The data structure 200 provides a view of the current information for each link, including the QoS Factor, configured interzone bandwidth, sliding maximum interzone bandwidth, actual instantaneous bandwidth used, and average calls/hour, as shown. As appreciated, the information/numbers provided in the table re for illustration purposes. While the source and destination zones are identified using a combination zone number and virtual private network identifier (VPNI), any identifier may be used to uniquely identify the respective zones.

In the example table in FIG. 2, one or more calls between Zone 5 and Zone 3 are experiencing QoS degradation within Zone 5. Similarly, one or more calls between Zone 7 and Zone 3 are experiencing QoS degradation within Zone 7. Thus, the sliding maximum interzone bandwidth value is a fraction of the configured interzone bandwidth (max allowable) for the link.

It will be understood that current calls may be also experiencing QoS degradation within Zone 3 also, however, in one embodiment, the call server 110 only receives real-time QoS information from its own corresponding communications devices, and not from communication devices within Zone 3 (in this case, the call server responsible for Zone 3 may be receiving any QoS alarms from its own corresponding devices).

In response to any new call setup requests for calls between Zone 5 and Zone 3, the call server 110 (Zone 5) determines whether the bandwidth necessary for the new call added to the current bandwidth would exceed the sliding maximum interzone bandwidth for that link. If within the limit, the call proceeds (at least to allow the call server in Zone 3 to make a similar determination). If not, the call is blocked or alternative routing is initiated, if desired. Similarly, n response to any new call setup requests for calls between Zone 7 and Zone 3, the call server 110 (Zone 5) determines whether the bandwidth necessary for the new call added to the current bandwidth would exceed the sliding maximum interzone bandwidth for that link. If within the limit, the call proceeds (at least to allow the call server in Zone 3 to make a similar determination). If not, the call is blocked or alternative routing is initiated, if desired.

Figure 3:
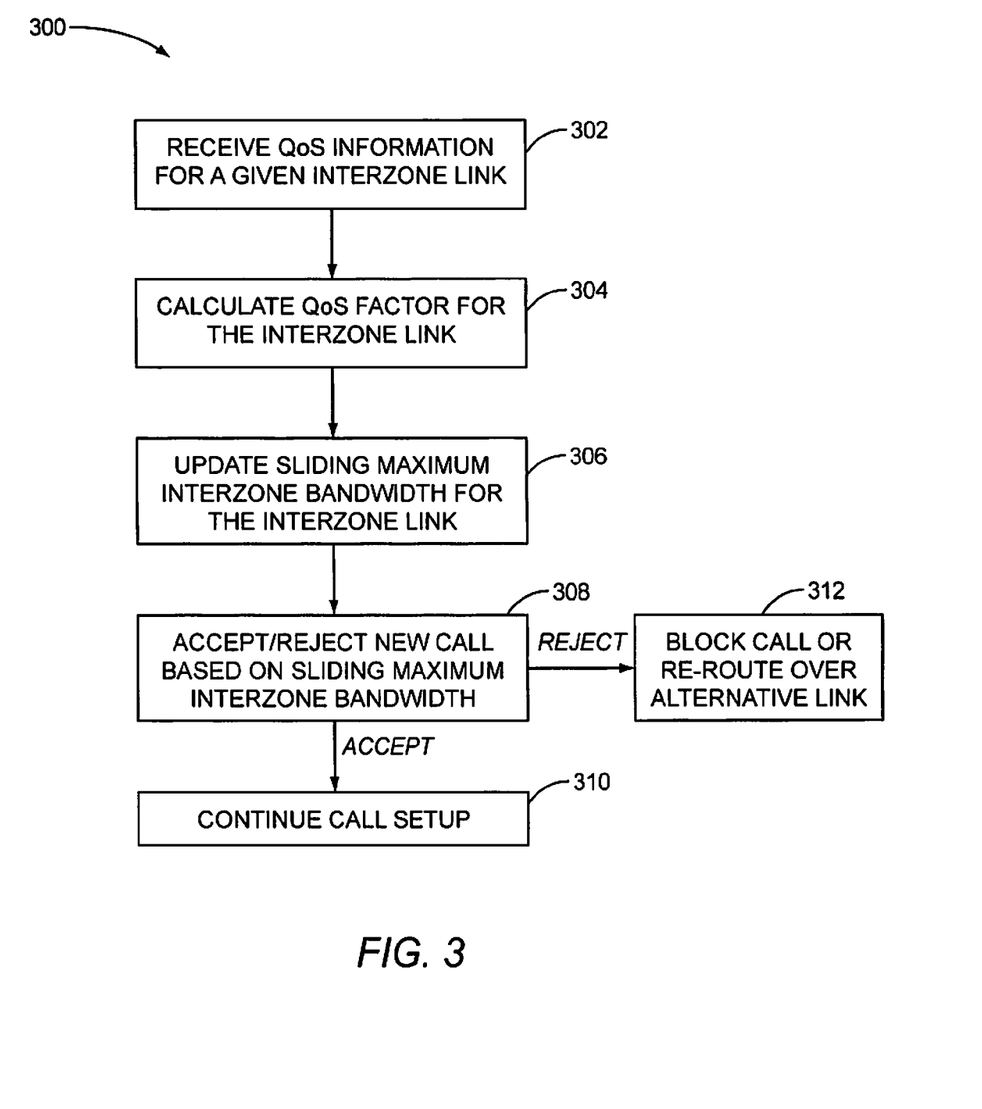
FIG. 3 illustrates an example method for adaptive network bandwidth management in accordance with one embodiment of the present invention.

Now referring to FIG. 3, there is illustrated and example method 300 of adaptive network bandwidth management in accordance with the present invention. At a step 302, QoS information for a given interzone link is received by the call server (or other call processing controller). The QoS information may take the form of QoS measurements made at one or more points in the interzone link, and in one embodiment, the QoS information takes the form of QoS alarm information generated by individual communications devices involved in active communication sessions across the interzone link. Described previously, the QoS information may be communicated directly to the call server, or to one or more other network devices (such as a signaling server) before reaching the call server. As will be appreciated, the QoS information/measurements are real-time (or substantially real-time) measurements.

At a step 304, the QoS information is used to calculate a QoS Factor for the interzone link. In general terms, when the QoS information indicates QoS degradation in the interzone link, the QoS Factor is calculated to reflect this the degradation. The QoS Factor may be calculated using the equation previously described. At a step 306, the sliding maximum interzone bandwidth for the interzone link is updated to reflect the current state of the interzone link based upon the received QoS information. The sliding maximum interzone bandwidth reflects the maximum bandwidth allowable across the interzone link and is utilized to determine whether to accept or reject new calls involving communications device(s) assigned to the call server in that particular bandwidth network zone.

At a step 308, a request for new call setup is received at the call server. Knowing the actual interzone bandwidth usage (or reserved bandwidth for current calls) within the interzone link, the call server, increments this amount by the anticipated additional bandwidth necessary for the new call, and compares this value to the sliding maximum interzone bandwidth value. If the value is within permissible limits, the call is accepted, at a step 310, the call setup process continues. If this value exceeds the sliding maximum value, the call is rejected, and at a step 312, the call is blocked or an alternative routing process occurs, such as re-routing over the PSTN or some other alternative route.

It will be understood that though the steps of method 300 are shown in FIG. 3 and described herein as being performed sequentially, the steps may be independently and/or concurrently performed. For example, the steps 306 and 308 are independent steps. As will be appreciated, the steps 302, 304 and 306 may be performed independently/concurrently with the steps 308, 310 and 312.

Several different examples of new call processing, as described with respect to the system 100 shown in FIG. 1, will now be described.

In a first example, call setup (and/or call processing) for a new call from the communication device 112a (in Zone 5) to the communication device 122b (in Zone 8) will now be generally described (peer to peer). In one embodiment, the communication devices 112a and 122b are IP phones. The communication device 112a originates the call. The source call server 110 determines the destination of the call (using NRS servers and/or some other method). The destination call server 120 determines whether there exists enough bandwidth available for a call between Zone 5 and Zone 8. Similarly, the source call server 110 determines whether there exists enough bandwidth available for the same call. If the determinations conclude that enough bandwidth exists, then the call is connected and the call proceeds conventionally.

The determinations made by each of the call servers 110, 120 may be independent of each other, and involve ascertaining the current interzone bandwidth usage (e.g., bandwidth count) between Zone 5 and Zone 8 (see FIG. 2). This amount is then incremented by the bandwidth amount the new call will utilize (if connected). This new value is compared to the sliding maximum interzone bandwidth value to determine whether enough bandwidth is available to proceed with the new call (see also, step 308, FIG. 3).

As will be appreciated, each call server stores information (as illustrated in FIG. 2) about the current interzone bandwidth usage, QoS Factors, and sliding maximum for each interzone link. This information is reflected from the viewpoint of that particular call server. In other embodiments, each call server may synchronize its data structure information with information from the other call servers, or a central data structure may be maintained. In such case, only one call server (either source or destination) may need to make the available bandwidth determination.

In a second example, call setup (and/or call processing) for a new call from the communication device 112a (in Zone 5) to a communication device (not shown) coupled to the VGW 140 (in Zone 9) will now be generally described (call server to gateway). In one embodiment, the communication device 112a is an IP phone. The communication device 112a originates the call. The source call server 110 determines the destination of the call (using NRS servers and/or some other method). In this example, the VGW 140 does not support the concept of network bandwidth zones, therefore a virtual trunk (VTRK) concept is used and the VGW is shown as one particular endpoint for Zone 9 (i.e., multiple VGWs may be configured in Zone 9). As such, the source call server 110 determines whether there exists enough bandwidth available for the call. If the determination concludes that enough bandwidth exists, then the call is connected and proceeds.

Similar to the first example, the determination made by call server 110 involves ascertaining the current interzone bandwidth usage between Zone 5 and Zone 9. This amount is then incremented by the bandwidth amount the new call will utilize (if connected). This new value is compared to the sliding maximum interzone bandwidth value to determine whether enough bandwidth is available to proceed with the new call.

In a third example, call setup (and/or call processing) for a new call from the communication device 112a (in Zone 5) to the communication device 132b (in Zone 7) will now be generally described (main office to SBO). In one embodiment, the communication devices 112a and 132a are IP phones. The communication device 112a originates the call. The source call server 110 determines the destination of the call (using NRS servers and/or some other method). The source call server 110 determines whether there exists enough bandwidth available for a call between Zone 5 and Zone 7. If the determination concludes that enough bandwidth exists, then the call is connected and the call proceeds conventionally.

The determination made by the call server 110 involves ascertaining the current interzone bandwidth usage (e.g., bandwidth count) between Zone 5 and Zone 7. This amount is then incremented by the bandwidth amount the new call will utilize (if connected). This new value is compared to the sliding maximum interzone bandwidth value to determine whether enough bandwidth is available to proceed with the new call.

In this specific example, the communication device 132a is coupled to the SBO 130 in Zone 7. Though located in Zone 7, the communication device 132a is registered to the call server 110 (in Zone 5). Thus, this is a station-to-station interzone call (not a trunk call) between Zone 5 and Zone 7.

In a fourth example, call setup (and/or call processing) for a new call from the communication device 132b (in Zone 7) to the communication device 122a (in Zone 8) will now be described (SBO analog device to IP device). In one embodiment, the communication device 132b is an analog phone and the communication device 122a is an IP phone. The communication device 132b originates the call. A voice gateway resource within the SBO 130 is reserved (which VGW resource is within Zone 7). The NRS server redirects the call to the main office call server 110 (as SBO calls are tandemed though the main office call server 110).

Call setup reaches the call server 110 which determines the destination of the call (using NRS servers and/or some other method). Call processing signaling occurs between the SBO 130, the call server 110, and the designation call server 120. The destination call server 120 determines whether exists enough bandwidth available for a call between Zone 7 and Zone 8. Similarly, the call server 110 determines whether there exists enough bandwidth available for the same call. If the determinations conclude that enough bandwidth exists, then the call is connected and proceeds.

As will be appreciated, the determinations and management made by each of the call servers 110, 120 may be similar to that described above with respect to the first example.

Although FIGS. 1 through 3 illustrate various systems and methods for adaptive network bandwidth management, various changes may be made to FIGS. 1 through 3. For example, the systems in FIG. 1 could include any number of communication devices, call servers, branch offices, gateways, and networks, and each call server, branch office and gateway may be coupled to any number of communication devices In some embodiments, the functions of the call servers branch office, and VGW are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of adaptive bandwidth management for a packet-based communications network, comprising: receiving quality of service (QoS) information from one or more end-user communications devices, the QoS information relating to active communications across a communications link between two zones in the packet-based communications network; storing a maximum interzone bandwidth value representing a maximum amount of allowable bandwidth on the communications link between the two zones; lowering the maximum bandwidth value to a sliding maximum interzone bandwidth value in response to the received QoS information; determining an amount of bandwidth presently being utilized across the communications link between the two zones; receiving a request for a new call between the two zones; determining an amount of bandwidth necessary to handle the new call; and rejecting the new call when the sum of the amount of bandwidth presently being utilized and the amount of bandwidth necessary for the new call exceeds the sliding maximum interzone bandwidth value.

2. The method in accordance with claim 1 wherein the QoS information comprises one or more QoS alarms generated and transmitted from the one or more end user communications devices within one of the zones, the one or more QoS alarms generated based on one or more QoS parameters.

3. The method in accordance with claim 1 wherein the QoS information comprises at least a one of following types of information: packet loss information, latency information, jitter information and R-Factor information.

4. The method in accordance with claim 1 wherein the QoS information comprises a QoS alarm generated and transmitted from a communication device within one of the zones.

5. The method in accordance with claim 4 wherein the QoS alarm comprises at least a one of the following: a packet loss alarm, a latency alarm, a jitter alarm and an R-Factor alarm.

6. The method in accordance with claim 1 further comprising:

raising the sliding maximum interzone bandwidth value by a predetermined amount over time; and accepting the new call when the sum of the amount of bandwidth presently being utilized and the amount of bandwidth necessary for the new call is below the sliding maximum interzone bandwidth value.

7. A call server, comprising: an network interface, for receiving quality of server (QoS) information from a second end-user communication device, the QoS information about an active communications link between a first zone and a second zone in a packet-based communications network, and for receiving a call setup message from a first end-user communications device requesting a new call over the communications link between the first zone and the second zone; a processor coupled to the network interface for processing the received QoS information and the call setup message, and determining whether to accept or reject the new call over the communications link between the first zone and the second zone; and wherein the processor is further operable for: storing a maximum interzone bandwidth value representing a maximum amount of allowable bandwidth on the communications link between the two zones, lowering the maximum bandwidth value to a sliding maximum interzone bandwidth value in response to the received QoS information, determining an amount of bandwidth presently being utilized across the communications link between the two zones, determining an amount of bandwidth necessary to handle the new call, and rejecting the new call when the sum of the amount of bandwidth presently being utilized and the amount of bandwidth necessary for the new call exceeds the sliding maximum interzone bandwidth value.

8. The call server in accordance with claim 7 wherein the QoS information is generated and transmitted from the second end-user communications device assigned to the call server during active communications between the first zone and the second zone.

9. The call server in accordance with claim 8 wherein the QoS information comprises one or more QoS alarms generated and transmitted from the second end-user communications device within one of the zones, the one or more QoS alarms generated based on one or more QoS parameters.

10. The call server in accordance with claim 7 wherein the QoS information comprises at least a one of following types of information: packet loss information, latency information, jitter information and R-Factor information.

11. The call server in accordance with claim 7 wherein the QoS information comprises at least one QoS alarm, and the QoS alarm comprises at least a one of the following: a packet loss alarm, a latency alarm, a jitter alarm and an R-Factor alarm.

12. The call server in accordance with claim 7 wherein the processor is further operable for:
 raising the sliding maximum interzone bandwidth value by a predetermined amount over time; and
 accepting the new call when the sum of the amount of bandwidth presently being utilized and the amount of bandwidth necessary for the new call is below the sliding maximum interzone bandwidth value.

13. A Non-transitory computer readable medium comprising instructions executed by a processor to: receive quality of service (QoS) information from one or more end-user communications devices, the QoS information relating to active communications across a communications link between two zones in the packet-based communications network; store a maximum interzone bandwidth value representing a maximum amount of allowable bandwidth on the communications link between the two zones; lower the maximum bandwidth value to a sliding maximum interzone bandwidth value in response to the received QoS information; determine an amount of bandwidth presently being utilized across the communications link between the two zones; receive a request for a new call between the two zones; determine an amount of bandwidth necessary to handle the new call; and reject the new call when the sum of the amount of bandwidth presently being utilized and the amount of bandwidth necessary for the new call exceeds the sliding maximum interzone bandwidth value.

14. The non-transitory computer readable medium in accordance with claim 13 wherein the QoS information comprises one or more QoS alarms generated and transmitted from a end-user communications devices within one of the zones, the one or more QoS alarms generated based on one or more QoS parameters.

15. The non-transitory computer readable medium in accordance with claim 13 wherein the QoS information comprises at least a one of following types of information: packet loss information, latency information, jitter information and R-Factor information.

16. The non-transitory computer readable medium in accordance with claim 15 wherein the QoS information comprises a QoS alarm generated and transmitted from a communication device within one of the zones.

17. The non-transitory computer readable medium in accordance with claim 13 further comprises instructions to: raise the sliding maximum interzone bandwidth value by a predetermined amount over time; and accept the new call when the sum of the amount of bandwidth presently being utilized and the amount of bandwidth necessary for the new call is below the sliding maximum interzone bandwidth value.

* * * * *